United States Patent
Cox et al.

(10) Patent No.: US 11,926,508 B2
(45) Date of Patent: Mar. 12, 2024

(54) RETAINING MECHANISM FOR A LOAD PIN ON A CLEVIS HOOK ASSEMBLY

(71) Applicant: Columbus McKinnon Corporation, Getzville, NY (US)

(72) Inventors: Luke James Cox, Flintstone, GA (US); Troy Allen Raines, Jr., Soddy Daisy, TN (US); Ronald Wesley Kluever, Wake Forest, NC (US)

(73) Assignee: Columbus McKinnon Corporation, Getzville, NY (US)

( * ) Notice: Subject to any disclaimer, the term of this patent is extended or adjusted under 35 U.S.C. 154(b) by 84 days.

(21) Appl. No.: 17/318,089

(22) Filed: May 12, 2021

(65) Prior Publication Data

US 2022/0363518 A1 Nov. 17, 2022

(51) Int. Cl.
*B66C 1/36* (2006.01)
*F16B 45/02* (2006.01)

(52) U.S. Cl.
CPC ............... *B66C 1/36* (2013.01); *F16B 45/02* (2013.01)

(58) Field of Classification Search
CPC .......... F16G 15/04; F16G 15/06; F16G 17/00; F16B 45/02; B66C 1/36
USPC .................... 294/82.11; 59/86, 93
See application file for complete search history.

(56) References Cited

U.S. PATENT DOCUMENTS

| | | |
|---|---|---|
| 3,958,411 A | 5/1976 | Bernt |
| 4,076,430 A | 2/1978 | Crook, Jr. |
| 4,100,729 A | 7/1978 | Bartoletto |
| 4,149,369 A * | 4/1979 | Smetz ...................... F16G 17/00 24/116 R |
| 4,257,638 A * | 3/1981 | Koval ....................... B66C 1/34 24/601.5 |
| 4,275,556 A * | 6/1981 | Stone ....................... F16G 15/00 294/82.11 |
| 4,914,903 A * | 4/1990 | Bernt ...................... F16G 15/06 474/218 |
| 5,046,881 A * | 9/1991 | Swager ................... F16G 15/06 403/324 |
| D730,717 S | 6/2015 | Moreau et al. |
| 9,115,742 B2 | 8/2015 | McClanahan et al. |
| 9,169,900 B1 | 10/2015 | Moreau et al. |
| 10,647,551 B1 * | 5/2020 | Fournier ................... B66C 1/36 |
| 2004/0075287 A1 | 4/2004 | Chang |
| 2005/0039309 A1 | 2/2005 | McCauley et al. |

FOREIGN PATENT DOCUMENTS

| | | | |
|---|---|---|---|
| DE | 19821675 C1 * | 2/2000 | ............... B66C 1/36 |
| GB | 2101264 A * | 1/1983 | ............. F16G 15/06 |
| GB | 2154686 | 9/1985 | |

OTHER PUBLICATIONS

Written Opinion of the International Searching Authority for PCT/US2022/028892, dated Aug. 26, 2022; 5 pages.

* cited by examiner

*Primary Examiner* — Dean J Kramer
(74) *Attorney, Agent, or Firm* — Phillips Lytle LLP; David L. Principe

(57) ABSTRACT

A retaining mechanism for a clevis hook assembly with an axial device that provides a retaining mechanism for a load pin. The axial device is disposed inside a first opening behind the load pin. The axial device may provide a retention mechanism to obstruct the load pin when the load pin is inserted into the first opening of one of the pair of opposed members and extends across a space into the first opening in the other opposed member.

6 Claims, 4 Drawing Sheets

RETAINING MECHANISM FOR A LOAD PIN ON A CLEVIS HOOK ASSEMBLY

TECHNICAL FIELD

The present invention relates generally to the field of hoists and rigging equipment, and more particularly to a retaining mechanism for a load pin on a clevis hook assembly.

BACKGROUND ART

Clevis hook assemblies include a hook at a first end for attaching to a load to be lifted by a crane or hoist. The hook assembly may also include a safety latch which may be recommended or required by the Occupation Health and Safety Administration ("OSHA") or the American Society of Mechanical Engineers ("ASME"). At the opposite end from the load, the clevis style hook assembly is provided with a pair of spaced apart, opposed members. The opposed members are typically arranged and configured to be in facing relation and are provided with openings defined therein to form a passageway through the opposed members. The openings receive a load pin for connecting the hook assembly to a wire or rope of a crane or hoist. The load pin may be provided with a head on one end that is larger than the openings to provide a stop for the axial displacement of the load pin. In order to keep the load pin from sliding out of the openings in the opposite direction, a retaining hole may be cross drilled in the load pin itself and a spring pin may be inserted into the retaining hole. As a result, the spring pin and the head of the load pin may be disposed on opposite sides of the opposed members to prevent the load pin from sliding out of the opposed members in the axial direction. Alternatively, a first opposed member may have an opening defined therein having a constant diameter and extending completely through the first opposed member. The second opposed member may have a bore defined therein with a closed end or a smaller diameter opening at the opposite end that prevents the load pin from sliding beyond a certain point. In this design, a transverse retaining hole may be drilled in the first opposed member and a retaining pin may be inserted into the transverse retaining hole (which may be threaded) to obstruct the load pin and thereby prevent the load pin from backing out of the aligned openings in the opposed members. There is a need for an improved design for a retention mechanism for use with a clevis hook assembly and a load pin that is advantageous both for manufacturing and for end users.

BRIEF SUMMARY OF THE INVENTION

The present invention meets the above described need by providing an improved retaining mechanism for a clevis hook assembly. With parenthetical reference to the corresponding parts, portions or surfaces of the disclosed embodiment, merely for the purposes of illustration and not by way of limitation, in one embodiment the present invention provides a hook assembly (10) with a hook (11) having a body portion (13) with a first end (16) and a second end (19). The body portion (13) extends along a curve to a tip (43) disposed at the second end (19). The body portion (13) has a neck portion (31) disposed in spaced apart relation to the tip (43) such than an opening(46) is formed between the tip (43) and the neck portion (31). The neck portion (31) may have an opening formed therein for mounting a safety latch (40).

The assembly (10) may further comprise a pair of opposed members (17, 18) extending from the hook (11) to form a clevis style hook. In another aspect, the opposed members (17, 18) may be disposed in spaced apart facing relation.

In another aspect, the opposed members (17, 18) may have openings (22, 25) defined therein sized to receive a load pin (27). The pair of opposed members (17,18) are disposed at the first end of the hook (11).

The pair of opposed members (17, 18) may define a space (20) therebetween. The opposed members (17, 18) each have a first opening (22, 25) sized to receive a load pin (27) configured to attach the hook (11) to a wire or rope of a crane or hoist.

The load pin (27) may be inserted through the first opening (22) in one of the pair of opposed members (17) and may extend across the space (20) into the first opening (25) of the other of the pair of opposed members (18). The load pin (27) may extend through the first opening (25) in an axial direction until there is a space behind the load pin (27) for receiving an axial device.

The axial device such as a spring pin (29) may be disposed inside the first opening (22) behind the load pin (27). The spring pin (29) may provide a retention mechanism to obstruct the load pin (27) when the load pin (27) is inserted into the first opening (22) of one of the pair of opposed members (17) and extends across the space (20) into the first opening (25) of the other opposed member (18).

In yet another aspect, one of the opposed members (18) may have a second opening (39) intersecting with the first opening (25). The second opening (39) may have a smaller diameter (28) than the diameter (26) of the first opening (25).

In another aspect, the load pin (27) may extend into the first opening (25) in one of the opposed members (18) until it is obstructed from further movement by the reduced diameter (28) of the second opening (39).

In yet another aspect of the clevis hook assembly, the load pin (27) has a head at one end.

In another aspect, the first opening (25) of one of the opposed members (18) extends to a closed end.

In another aspect, the axial device is a spring pin (29).

In another aspect, the axial device is a knurled plug.

In yet another aspect, the axial device is cylindrical.

In another aspect, the load pin (27) is cylindrical.

In another aspect, the longitudinal axis of the axial device is parallel to the longitudinal axis of the load pin (27).

DESCRIPTION OF THE PREFERRED EMBODIMENTS

Figure 1:
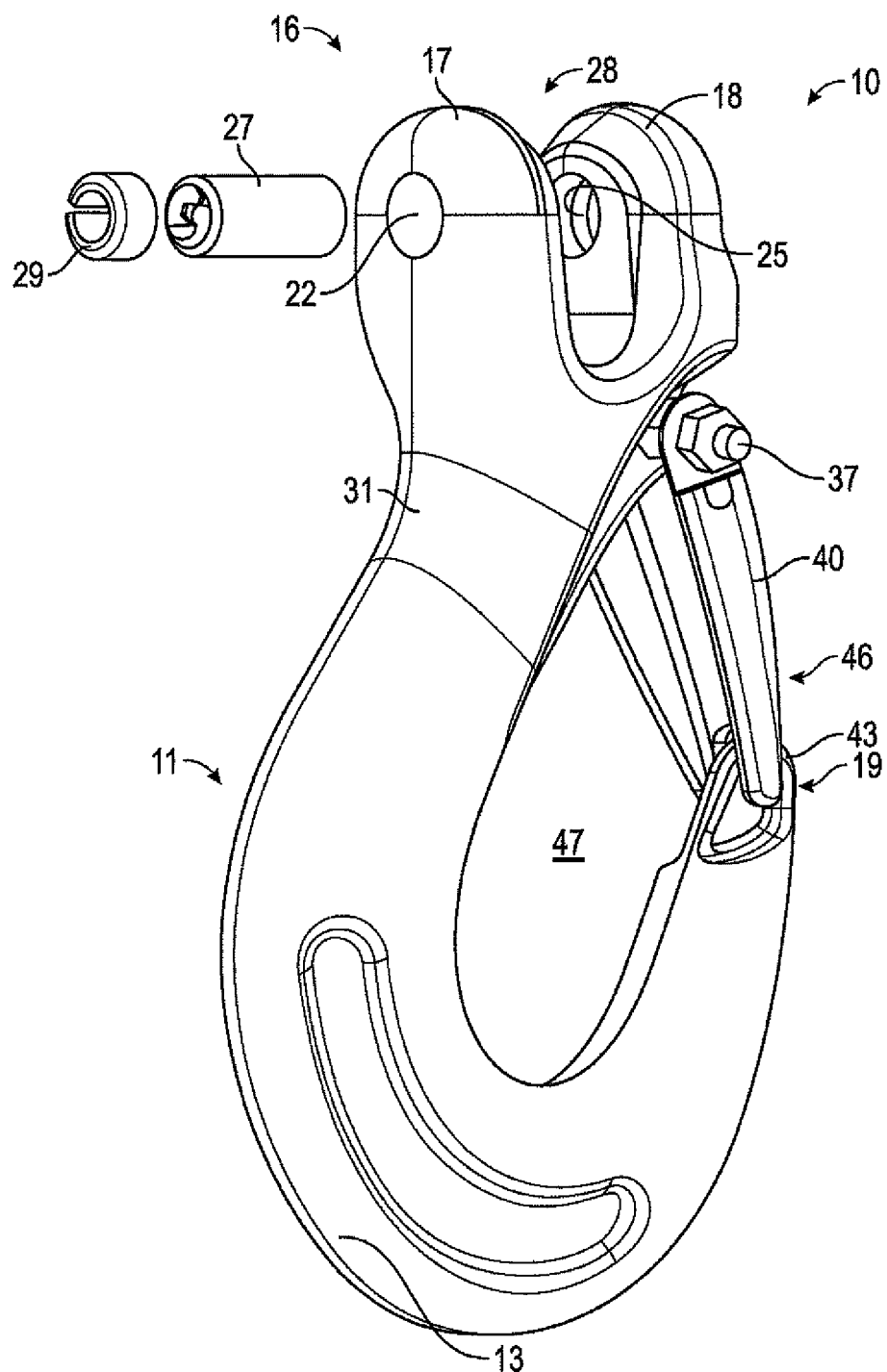
FIG. 1 is an exploded perspective view of one embodiment of the clevis hook assembly of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring generally to FIGS. 1-4, and initially to FIG. 1 thereof, this invention provides a clevis hook assembly 10 with a hook 11 having a body 13 with a first end 16 and a second end 19. The hook 11 may be formed of a high strength material such as steel or the like for use in industrial applications for connecting a load to a crane, hoist or the like. The first end 16 may be provided with a pair of spaced apart, first and second opposed members 17 and 18, respectively, that terminate at the first end 16 of the body 13. The first and second opposed members 17 and 18 may be configured in facing relation and may be provided with cylindrical shaped openings 22 and 25 defined therein. The openings 22, 25 receive a load pin 27 for connecting the hook assembly 10 to a wire or rope. The first and second opposed members 17 and 18 form a U-shaped opening 20 (FIG. 4) therebetween. The first and second opposed members 17 and 18 are configured in this manner for attaching the hook assembly 10 to a wire rope or cable attached to a crane or hoist. The first and second opposed members 17 and 18 extend upward from a neck portion 31 of the body 13.

The neck portion 31 may be provided with an opening for receiving a fastener 37. The fastener 37 pivotally attaches a latch 40 to the neck portion 31. The body 13 extends along a curve until it reaches the second end 19. The second end 19 terminates in a tip 43. An opening 46 is formed between the tip 43 and the neck portion 31. The opening 46 leads to a U-shaped space 47 defined by the body 13 of the hook 11.

The latch 40 is pivotally attached to the neck portion 31. A biasing member (not shown) such as a spring or the like may bias the latch 40 in the counterclockwise direction.

In FIG. 1, cylindrical opening 22 passes completely through the first opposed member 17 and may be provided with a first diameter 23 (FIG. 4) that may be constant. The first diameter 23 of the opening 22 is sized to receive the load pin 27. The cylindrical opening 25 extends through the second opposed member 18 and has a first diameter 26 (FIG. 4) that is equal to the first diameter 23 of the first opening 22 for a portion of the width of the second opposed member 18. The first diameter 26 of opening 25 terminates at a second portion 39 of the second opposed member 18 that has a smaller diameter 28 (FIG. 4) as described in greater detail herein. The smaller diameter 28 prevents the load pin 27 from sliding any farther through the aligned openings 22, 25 (best shown in FIG. 4).

Figure 4:
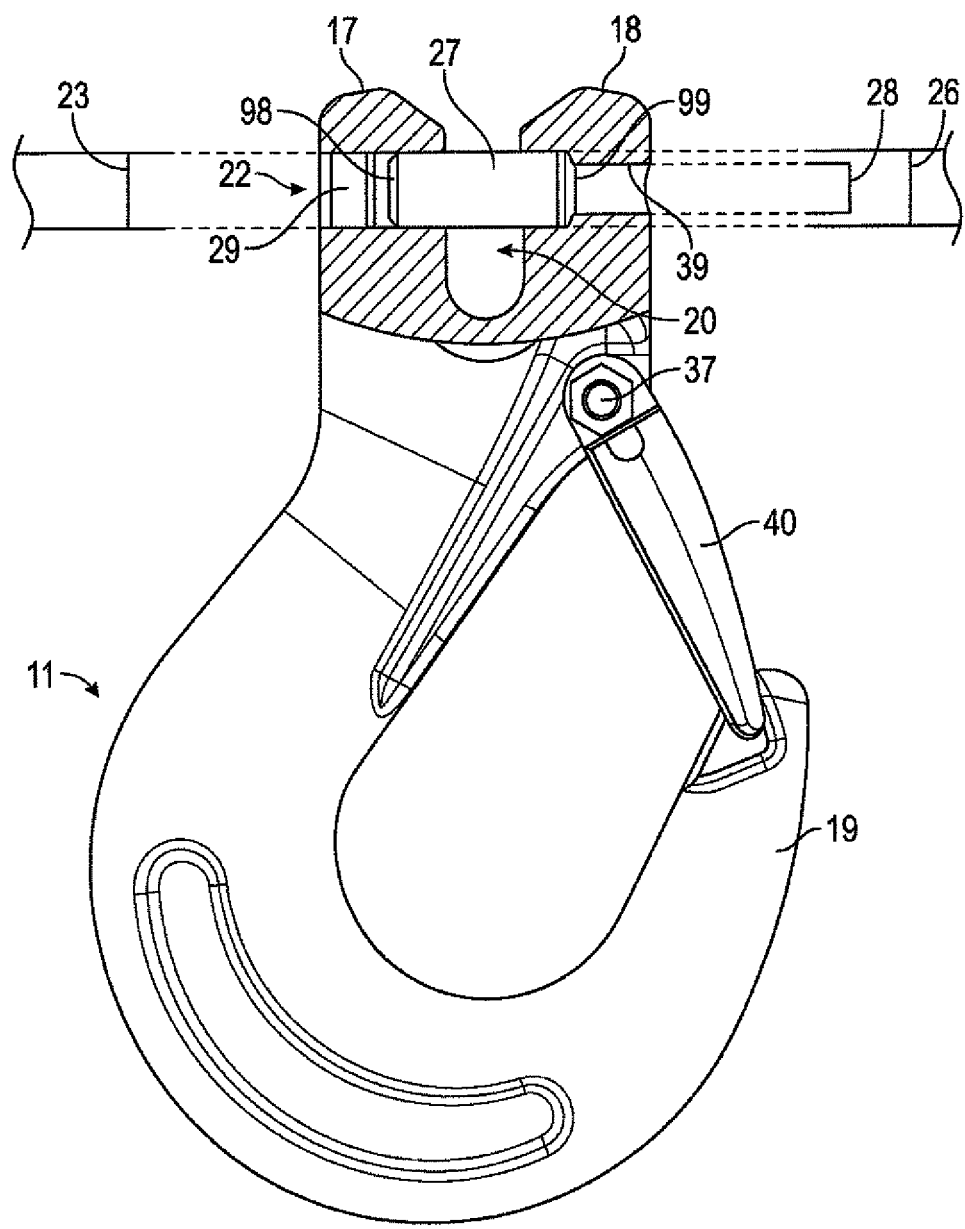
FIG. 4 is a partial cross-sectional view of the assembly of FIG. 1 taken along lines 4-4 of FIG. 3.

In the embodiment shown, the load pin 27 is inserted through the opening 22 in the first opposed member 17 and slides through opening 22 such that a distal end 99 (FIG. 4) of the load pin 27 is received in the opening 25 and slides into the second opposed member 18. The load pin 27 slides in this direction until the distal end 99 (FIG. 4) is prevented by the smaller diameter section 28 in the second opposed member 18 from sliding any farther. In this position, there is a space between the end of opening 22 and the proximal end 98 (FIG. 4) of the load pin 27. The space may be filled by inserting a spring pin 29, knurled plug or other axial device into the opening 22 in the same direction behind the load pin 27. As best shown in FIG. 4, a coiled spring pin 29 may be disposed in opening 22 behind the load pin 27. The coiled spring 29 is biased such that it expands outwardly and engages the inside walls defining opening 22. The force of the coil spring 29 against the inner wall bordering the opening 22 locks the spring 29 in position in the opening 22 and prevents the load pin 27 from backing out of the aligned openings 22 and 25.

Figure 2:
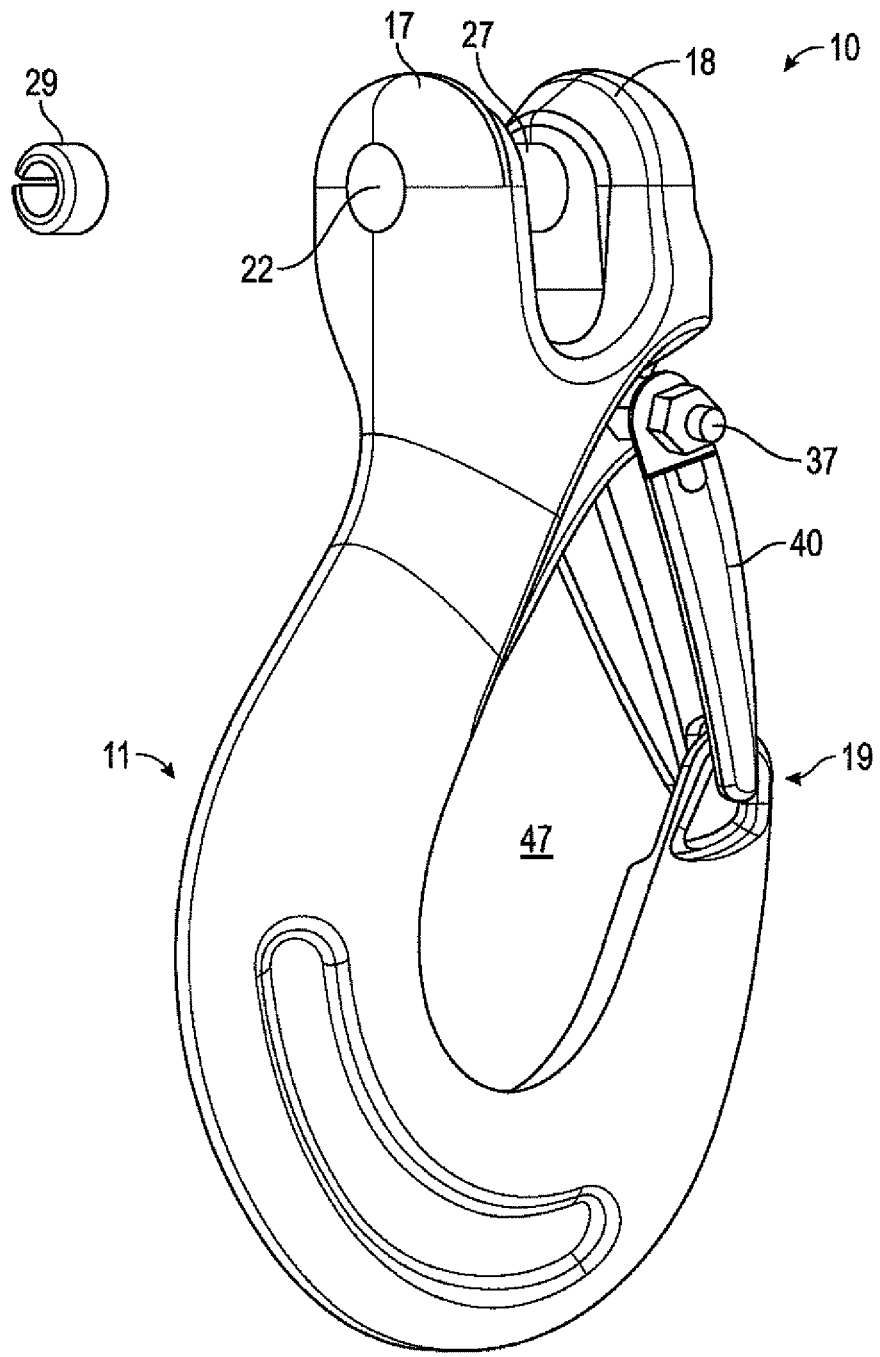
FIG. 2 is a partially exploded perspective view of the assembly of FIG. 1.

Turning to FIG. 2, the clevis hook assembly 10 is shown with the load pin 27 installed and the retaining mechanism in the form of a spring pin 29 shown separate from the assembly in an exploded view.

Figure 3:
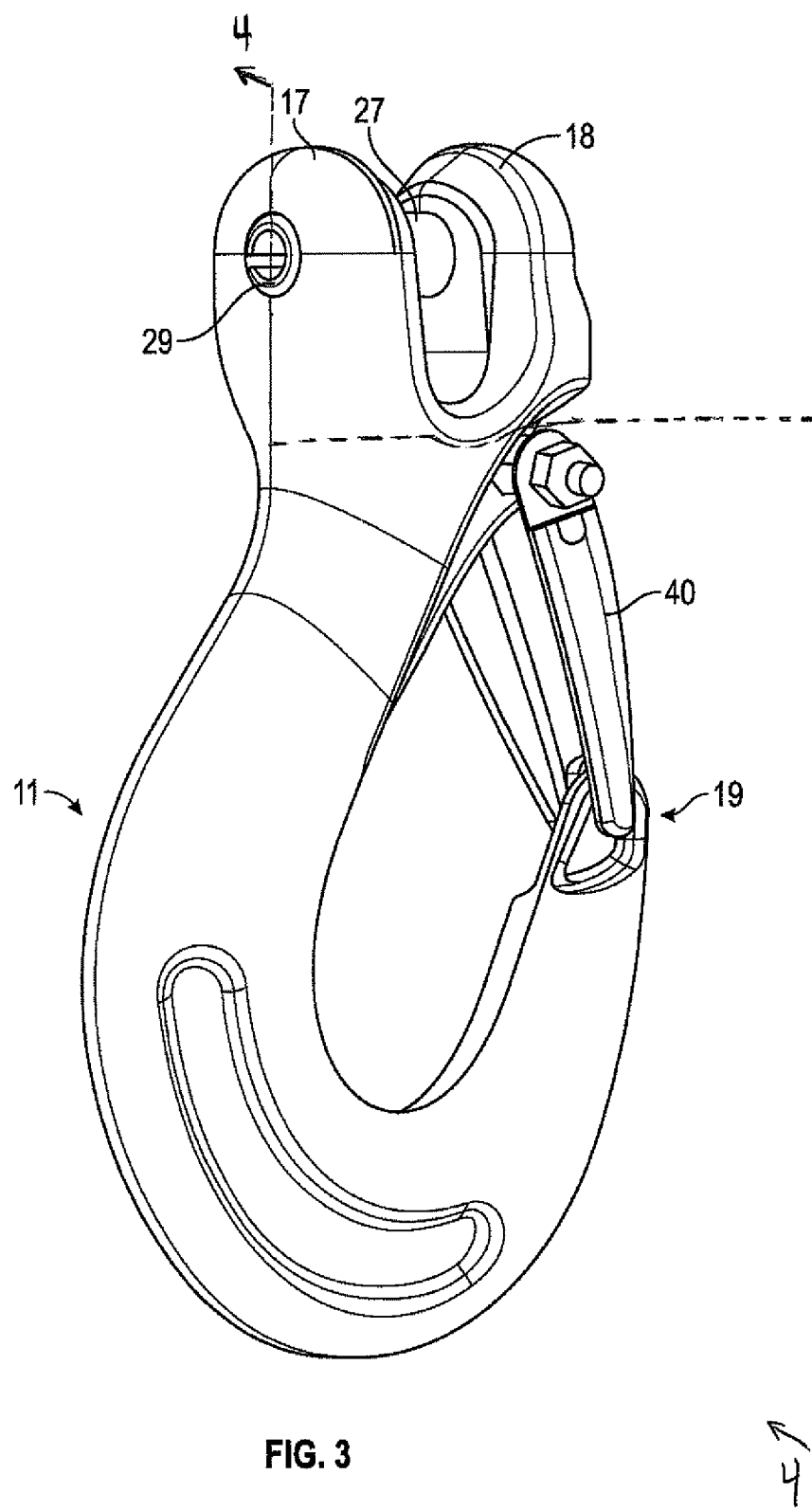
FIG. 3 is a perspective view of the assembly of FIG. 1.

In FIG. 3, the clevis hook assembly 10 is shown with the load pin 27 and the spring pin 29 engaged. As shown the spring pin 29 is installed in the opening 22 of the first opposed member 17. The end of the spring pin 29 is substantially coterminous with the end of the opening 22 in the first opposed member 17. The spring 29 is biased in the inward radial direction and expands outward inside the opening 22 such that it provides a force against the walls of the opposed member 17 bordering the opening 22. The spring pin 29 is disposed behind and adjacent to the load pin 27 such that it blocks movement of the load pin 27 in the axial direction at one end of the load pin 27. The other end of the load pin 27 may be blocked by the reduced diameter section 28 inside the second opposed member 18 as described herein.

In FIG. 4, the opening 22 in the first opposed member 17 extends all the way through opposed member 17 and has a substantially uniform diameter 23 sized to receive the load pin 27 with enough clearance to provide for the load pin 27 to easily slide in the cylindrical shaped opening 22 without excess play.

The load pin 27 extends across the U-shaped gap 20 (FIG. 4) that is formed between the first and second opposed members 17 and 18 and enters the opening 25 in the second opposed member 18. The cylindrical opening 25 extends at a substantially constant diameter 26 for a first portion of the second opposed member 18. The opening 25 extends at the first diameter 26 until it intersects with a second cylindrical opening 39 having a smaller diameter 28 that extends from a midportion of the second opposed member 18 to the right side of the second opposed member 18. The smaller diameter opening 39 provides an end point that prevents the load pin 27 from moving any farther from left to right with respect to the figure.

The present invention contemplates that many changes and modifications may be made. Therefore, while the presently-preferred form of the retaining mechanism for the clevis hook assembly has been shown and described, and several modifications and alternatives discussed, persons skilled in this art will readily appreciate that various additional changes and modifications may be made without departing from the spirit of the invention, as defined and differentiated by the following claims.

The invention claimed is:

1. A clevis hook assembly, comprising:
   a hook having a body portion with a first end and a second end, the body portion extending along a curve to a tip disposed at the second end, the body having a neck portion disposed in spaced apart relation to the tip such than an opening is formed between the tip and the neck portion;
   a pair of opposed members disposed at the first end of the hook, the pair of opposed members defining a space therebetween, the opposed members disposed in spaced apart facing relation, the opposed members each having a first opening sized to receive a load pin configured to attach the hook to a wire or rope of a crane or hoist;

wherein the load pin is inserted through the first opening in one of the pair of opposed members and extends across the space and into the first opening of the other of the pair of opposed members where it extends through the first opening in an axial direction such that there is a space inside the first opening in one of the pair of opposed members behind the load pin; and, an axial device disposed inside the first opening in one of the pair of opposed members and positioned behind the load pin when the load pin is inserted into the first opening of one of the pair of opposed members and extends across the space into the first opening of the other opposed member, wherein the first opening on one of the pair of opposed members extends through one of the pair of opposed members at a substantially constant diameter and wherein the pair of opposed members do not contain any transverse openings intersecting with the first opening; and, wherein the axial device is a spring pin.

2. A clevis hook assembly, comprising:

a hook having a body portion with a first end and a second end, the body portion extending along a curve to a tip disposed at the second end, the body having a neck portion disposed in spaced apart relation to the tip such than an opening is formed between the tip and the neck portion;

a pair of opposed members disposed at the first end of the hook, the pair of opposed members defining a space therebetween, the opposed members disposed in spaced apart facing relation, the opposed members each having a first opening sized to receive a load pin configured to attach the hook to a wire or rope of a crane or hoist;

wherein the load pin is inserted through the first opening in one of the pair of opposed members and extends across the space and into the first opening of the other of the pair of opposed members where it extends through the first opening in an axial direction such that there is a space inside the first opening in one of the pair of opposed members behind the load pin; and, an axial device disposed inside the first opening in one of the pair of opposed members and positioned behind the load pin when the load pin is inserted into the first opening of one of the pair of opposed members and extends across the space into the first opening of the other opposed member, wherein the first opening on one of the pair of opposed members extends through one of the pair of opposed members at a substantially constant diameter and wherein the pair of opposed members do not contain any transverse openings intersecting with the first opening; and, wherein the axial device is a knurled plug.

3. A clevis hook assembly, comprising:

a hook having a body portion with a first end and a second end, the body portion extending along a curve to a tip disposed at the second end, the body having a neck portion disposed in spaced apart relation to the tip such than an opening is formed between the tip and the neck portion;

a pair of opposed members disposed at the first end of the hook, the pair of opposed members defining a space therebetween, the opposed members disposed in spaced apart facing relation, the opposed members each having a first opening sized to receive a load pin configured to attach the hook to a wire or rope of a crane or hoist;

wherein the load pin is inserted through the first opening in one of the pair of opposed members and extends across the space and into the first opening of the other of the pair of opposed members where it extends through the first opening in an axial direction such that there is a space inside the first opening in one of the pair of opposed members behind the load pin; and, an axial device disposed inside the first opening in one of the pair of opposed members and positioned behind the load pin when the load pin is inserted into the first opening of one of the pair of opposed members and extends across the space into the first opening of the other opposed member, wherein the first opening on one of the pair of opposed members extends through one of the pair of opposed members at a substantially constant diameter and wherein the pair of opposed members do not contain any transverse openings intersecting with the first opening; and, wherein the axial device is cylindrical.

4. A clevis hook assembly, comprising:

a hook having a body portion with a first end and a second end, the body portion extending along a curve to a tip disposed at the second end, the body having a neck portion disposed in spaced apart relation to the tip such than an opening is formed between the tip and the neck portion;

a pair of opposed members disposed at the first end of the hook, the pair of opposed members defining a space therebetween, the opposed members disposed in spaced apart facing relation, the opposed members each having a first opening sized to receive a load pin configured to attach the hook to a wire or rope of a crane or hoist;

wherein the load pin is inserted through the first opening in one of the pair of opposed members and extends across the space and into the first opening of the other of the pair of opposed members where it extends through the first opening in an axial direction such that there is a space inside the first opening in one of the pair of opposed members behind the load pin; and, an axial device disposed inside the first opening in one of the pair of opposed members and positioned behind the load pin when the load pin is inserted into the first opening of one of the pair of opposed members and extends across the space into the first opening of the other opposed member, wherein the first opening on one of the pair of opposed members extends through one of the pair of opposed members at a substantially constant diameter and wherein the pair of opposed members do not contain any transverse openings intersecting with the first opening; and, wherein the longitudinal axis of the axial device is parallel to the longitudinal axis of the load pin.

5. A clevis hook assembly, comprising:

a hook having a body portion with a first end and a second end, the body portion extending along a curve to a tip disposed at the second end, the body having a neck portion disposed in spaced apart relation to the tip such than an opening is formed between the tip and the neck portion;

a pair of opposed members disposed at the first end of the hook, the pair of opposed members defining a space therebetween, the opposed members disposed in spaced apart facing relation, the opposed members each having a first opening sized to receive a load pin configured to attach the hook to a wire or rope of a crane or hoist and one of the pair of opposed members having a second opening intersecting with the first opening, the second opening smaller than the first opening;

wherein the load pin is inserted through the first opening in one of the pair of opposed members and extends across the space and into the first opening of the other of the pair of opposed members where it extends through the first opening until it is obstructed from further movement by the second opening, the load pin extending into the pair of opposed members in an axial direction such that there is a space inside the first opening in one of the pair of opposed members behind the load pin; and, an axial device disposed inside the first opening in one of the pair of opposed members and positioned behind the load pin when the load pin is inserted into the first opening of one of the pair of opposed members and extends across the space into the first opening of the other opposed member until it reaches the second opening, wherein the first opening on one of the pair of opposed members extends through one of the pair of opposed members at a substantially constant diameter and wherein the pair of opposed members do not contain any transverse openings intersecting with the first opening; and, wherein the axial device is cylindrical.

6. A clevis hook assembly, comprising:
a hook having a body portion with a first end and a second end, the body portion extending along a curve to a tip disposed at the second end, the body having a neck portion disposed in spaced apart relation to the tip such than an opening is formed between the tip and the neck portion;

a pair of opposed members disposed at the first end of the hook, the pair of opposed members defining a space therebetween, the opposed members disposed in spaced apart facing relation, the opposed members each having a first opening sized to receive a load pin configured to attach the hook to a wire or rope of a crane or hoist and one of the pair of opposed members having a second opening intersecting with the first opening, the second opening smaller than the first opening;

wherein the load pin is inserted through the first opening in one of the pair of opposed members and extends across the space and into the first opening of the other of the pair of opposed members where it extends through the first opening until it is obstructed from further movement by the second opening, the load pin extending into the pair of opposed members in an axial direction such that there is a space inside the first opening in one of the pair of opposed members behind the load pin; and, an axial device disposed inside the first opening in one of the pair of opposed members and positioned behind the load pin when the load pin is inserted into the first opening of one of the pair of opposed members and extends across the space into the first opening of the other opposed member until it reaches the second opening, wherein the first opening on one of the pair of opposed members extends through one of the pair of opposed members at a substantially constant diameter and wherein the pair of opposed members do not contain any transverse openings intersecting with the first opening; and, wherein the axial device has a longitudinal axis that is parallel to a longitudinal axis of the load pin when the axial device and load pin are disposed in the clevis hook assembly.

* * * * *

UNITED STATES PATENT AND TRADEMARK OFFICE
CERTIFICATE OF CORRECTION

| | | |
|---|---|---|
| PATENT NO. | : 11,926,508 B2 | Page 1 of 1 |
| APPLICATION NO. | : 17/318089 | |
| DATED | : March 12, 2024 | |
| INVENTOR(S) | : Luke James Cox et al. | |

It is certified that error appears in the above-identified patent and that said Letters Patent is hereby corrected as shown below:

In the Claims

Column 4, at Line 64, in Claim 1, please delete "than" which appears before "an opening is formed between the tip and the neck portion;" and replace it with --that--;

Column 5, at Line 30, in Claim 2, please delete "than" which appears before "an opening is formed between the tip and the neck portion;" and replace it with --that--;

Column 5, at Line 62, in Claim 3, please delete "than" which appears before "an opening is formed between the tip and the neck portion;" and replace it with --that--;

Column 6, at Line 27, in Claim 4, please delete "than" which appears before "an opening is formed between the tip and the neck portion," and replace it with --that--;

Column 6, at Line 60, in Claim 5, please delete "than" which appears before "an opening is formed between the tip and the neck portion," and replace it with --that--; and Column 7, at Line 32 in Claim 6, please delete "than" which appears before "an opening is formed between the tip and the neck portion," and replace it with --that--.

Signed and Sealed this
Thirtieth Day of September, 2025

John A. Squires
*Director of the United States Patent and Trademark Office*